United States Patent [19]
Li

[11] Patent Number: 5,862,054
[45] Date of Patent: Jan. 19, 1999

[54] PROCESS MONITORING SYSTEM FOR REAL TIME STATISTICAL PROCESS CONTROL

[75] Inventor: Hung-Yeh Li, Taipei, Taiwan

[73] Assignee: Taiwan Semiconductor Manufacturing Company, Ltd., Hsin-Chu, Taiwan

[21] Appl. No.: 803,353

[22] Filed: Feb. 20, 1997

[51] Int. Cl.[6] .................................................. G06F 19/00
[52] U.S. Cl. ............... 364/468.28; 364/185; 364/468.15; 364/468.16; 364/554
[58] Field of Search ........................ 364/468, 28, 468.24, 364/554, 478.01, 184, 185, 468.15, 468.16

[56] References Cited

U.S. PATENT DOCUMENTS

| | | | |
|---|---|---|---|
| 4,027,246 | 5/1977 | Caccoma et al. ..................... | 235/151.1 |
| 4,974,166 | 11/1990 | Maney et al. ........................... | 364/478 |
| 5,440,478 | 8/1995 | Fisher et al. ........................... | 364/188 |
| 5,479,340 | 12/1995 | Fox et al. ............................... | 364/153 |
| 5,483,468 | 1/1996 | Cheu et al. ........................ | 364/551.01 |
| 5,537,325 | 7/1996 | Iwakiri et al. ..................... | 364/468.28 |
| 5,586,059 | 12/1996 | Oshelski et al. ................... | 364/468.28 |

*Primary Examiner*—Paul P. Gordon
*Attorney, Agent, or Firm*—George O. Saile; Stephen B. Ackerman

[57] ABSTRACT

This invention describes a method to monitor process parameters from multiple process machines to provide real time statistical process control (SPC). The particular implementation was derived from ion implantation of wafers, but has wide applicability where there are a number of process machines having a number of process parameters and close continuous sampling of data is required. The process parameters are collected on a single computer over a single RS 485 network, and each parameters is analyzed and displayed separately for each process and process machine. Statistical variables like Cp and Cpk arc calculated and presented on the computer screen along with graphs of the various parameters for a particular process machine. Data is aged out of the computer to an archival data base under the control of a manufacturing information system and connected to a company wide network.

15 Claims, 6 Drawing Sheets

PROCESS MONITORING SYSTEM FOR REAL TIME STATISTICAL PROCESS CONTROL

BACKGROUND OF THE INVENTION

1. Field of Invention

This invention relates to manufacturing process control and in particular, real time monitoring of process parameters and statistical process control.

2. Description of Related Art

High yield is maintained through a high level of process control which includes having the right process recipe, collecting process parameter data and comparing the data to a set of established control limits. Often this entails fine tuning of the process in an attempt to optimize the process to produce higher yield. Measurements of key process parameters needed to understand the status of a process has been manually collected and often without the continuity or history to produce the desired results. Attempts have been made to automatically collect and warehouse the parameter data. This can be difficult because of the volume of data. The development of statistical techniques has led to the ability to handle the volume of data while providing a continuous real time monitor of the status of a process.

In U.S. Pat. No. 5,483,468 (Chen et al.) is described a system and method for concurrently recording and displaying system performance data for a computing system. In this invention is described a method in which a user interacts with the data being displayed to create various analysis of that data with the intentions of improving the computer system performance.

Referring to U.S. Pat. No. 5,479,340 (Fox et al.) is described a multivariate analysis of components of an ongoing semiconductor process for real time in-situ control. In this invention the algorithm calculates the $T^2$ value from Holding's $T^2$ statistical analysis which in turn creates a feedback signal if the $T^2$ value is out of range and stopping the process.

In U.S. Pat. No. 5,440,478 (Fisher et al.) a method and system for controlling a manufacturing process using statistical indicators of performance from the production process and specification data. The data is enter into a computer and displayed in tables and bar graphs to enable the production control manager to see unfavorable trends and processes out of control to allow adjustment of the manufacturing process before the process run is completed. Whereas U.S. Pat. No. 5,440,478 appears to have similarity to the invention described herein, it relies on manual collection and entry of data into a computing system for analysis and display.

A major problem with real time process control using real time data can be the volume of data that is produced by a process machine. This requires a system be established that can handle the volume of data without overwhelming the resulting process. It is important that old data to be available for long term trends analysis as well as for trouble shooting the process. Thus a system is needed that provides real time collection and analysis of the process data and allows the archiving of data no longer needed for real time analysis.

SUMMARY OF THE INVENTION

The invention describe herein is a process parameter monitoring system for real time statistical process control having the capability to monitor multiple process machines at the same time with a mix of different types of machines. The specific implementation is in connection with semiconductor wafer fabrication process machinery such as for ion implantation. It is also applicable to other processes and process equipment where it is necessary for automatic collection of process parameter data for statistical process control (SPC) and the subsequent usage of the data to show trends and the goodness of the operating machinery.

The process parameter monitoring system is controlled by a production control computer. Contained within the production control computer is a data base used to store process parameter data used in the monitor and control of the process machinery. The process parameter data is stored for several months and is used to determine process control limits as well as trends in the characteristics of the process. The process control computer is connected to a company wide network through a server. Through the company wide network the process parameter monitoring system communicates with a production manufacturing information system (PROMIS) from which data such as the process recipe can be stored and retrieved, and process data can be archived.

Data is connected between production process machinery and a production control computer by means of a single RS 485 network and various network adapters. Each adapter has its own network address, and through means of control by the production control computer, communication is synchronized between adapters. Multiple process machinery of various types can be collected to the production control computer through the RS 485 network. Each process machine providing key process parameter data to be applied to a real time SPC analysis. The data for each machine is accumulated separately and applied to its own SPC analysis.

The data once analyzed is presented on the screen of the production control computer through a graphical users interface (GUI). The presentation is in the form of graphs and charts showing the trend of the data for important parameters like vacuum, E-shower and energy for ion implantation machinery. Along with the graphics is shown specific values such as rough time and pump time for ion implantation machinery and values for Cp and Cpk from SPC analysis. There is also an alarm indicator when the process is out of control, and an accounting for the number of alarms that have occurred over the time interval of data being shown in the charts and graphs.

The process parameter monitoring system can display historical data on the production control computer. This historical data can go back several weeks or months for each process parameter for each machine and is obtained from the data base contained within the production control computer. This display of historical data can be important in the analysis of problems leading to poor yield. When there is a particular problem with a process or associated machinery, a short interval monitor of the particular process can be initiated that accumulates three data points in one second; although, not limited to 1 second in duration. Thus providing a quick sampling of a process that may be producing a problem. When debugging a particular process on a particular machine, the monitoring of that machine can be stopped or started without affecting the monitoring of the other processes on other process machinery.

BRIEF DESCRIPTION OF THE DRAWINGS

This invention will be described with reference to the accompanying drawings, wherein.

DETAILED DESCRIPTION OF THE PREFERRED EMBODIMENT

Figure 1:
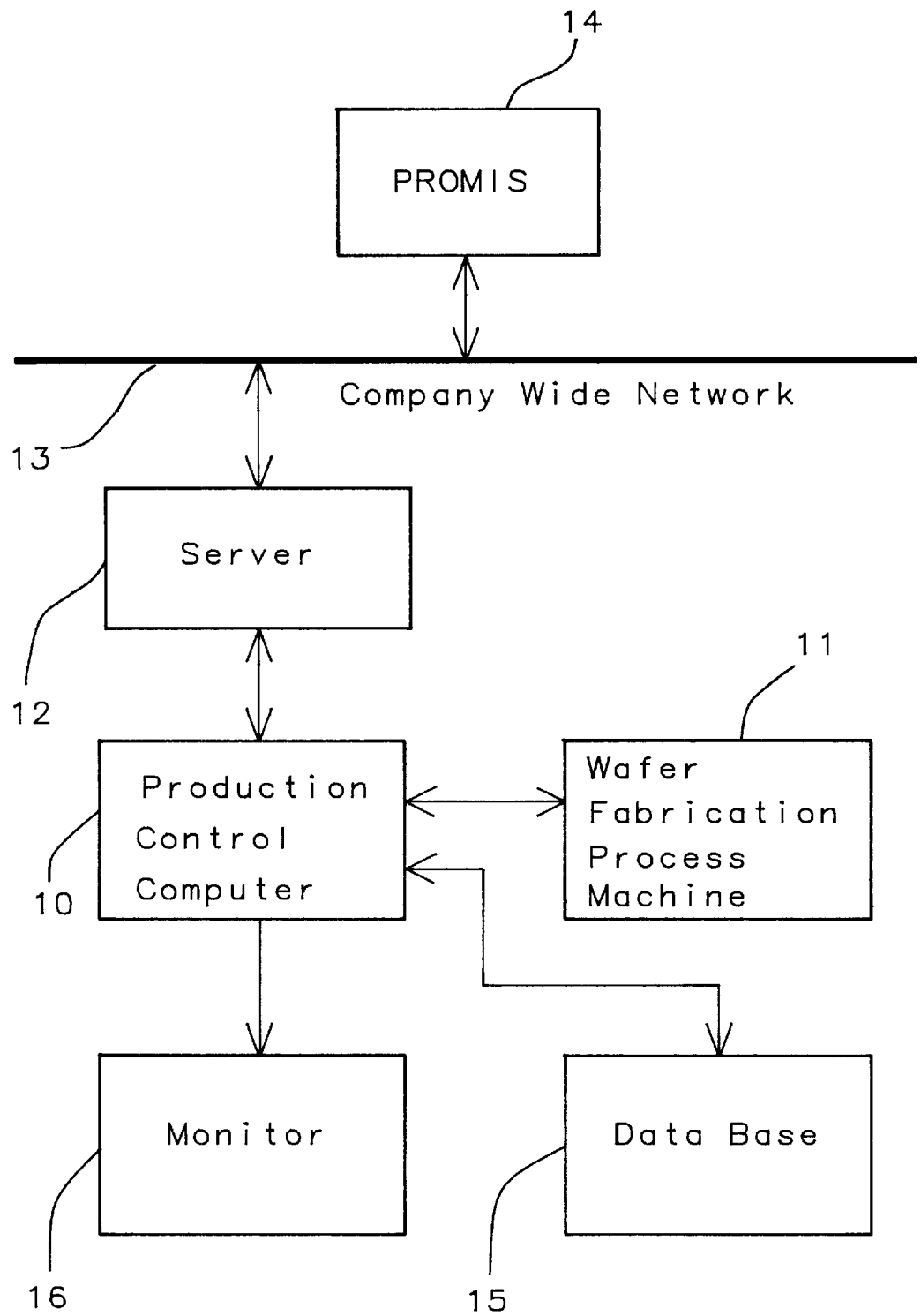
FIG. 1 is an overview of the process parameter monitoring system for real time SPC.

In FIG. 1 is shown an overview of a process parameter monitoring system for use in real time SPC. A production control computer 10 is connected to wafer fabrication machinery 11 for the purpose of controlling the wafer fabrication machine 11 and collecting process parameter data for analysis and display on the monitor 16 of the production control computer 10. The production control computer 10 contains a data base 15 which is used to store wafer fabrication process parameter data. The wafer fabrication process data is used to compute parameters such as Cp and Cpk for SPC analysis as well as computing various process parameter trends. The monitor 16 of the production control computer 10 is used to display various data, including charts and graphs of the process parameter data, like vacuum, E-shower and energy for ion implantation, as well single data values including some from the SPC analysis, like Cp and Cpk.

Continuing to refer to FIG. 1, the production control computer 10 is connected to a data server 12. The data server provides access to the company wide network 13 from which the production control computer 10 has access to the production manufacturing information system (PROMIS) 14. The production control computer 10 can access various data from PROMIS 14 such as the recipe for a particular wafer fabrication process and characteristics of the different process equipment.

Figure 2A:
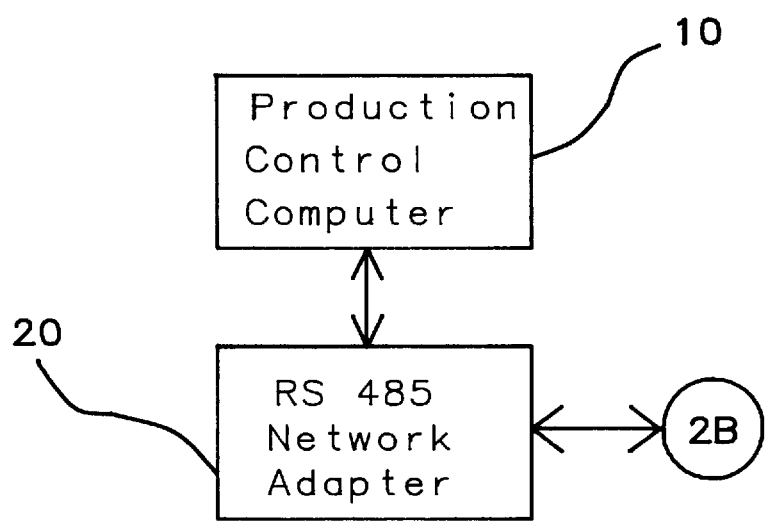
FIGS. 2A and 2B are a diagram of the of the connections between the process equipment and the production control computer for data monitoring.
Figure 2B:
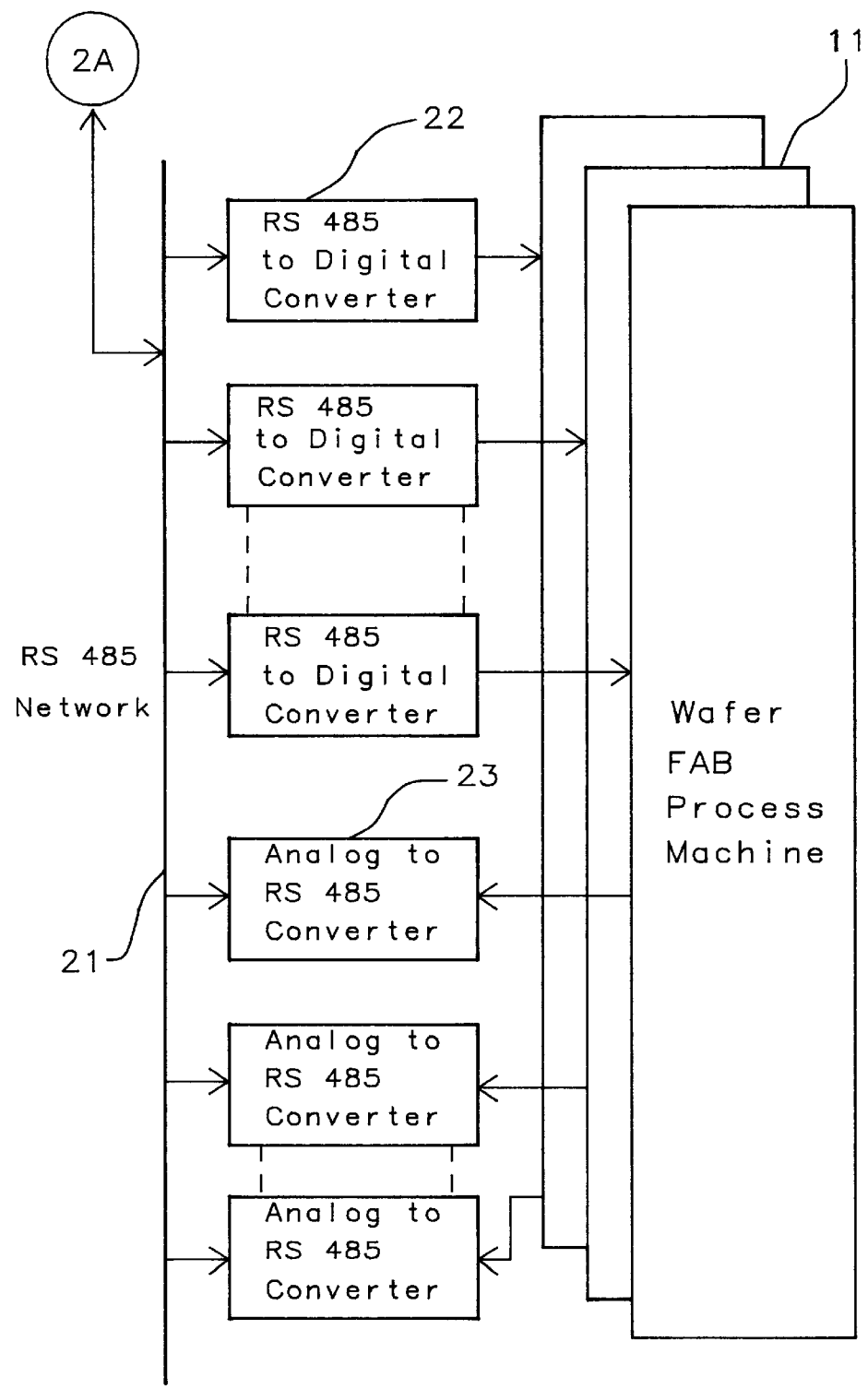

Referring to FIG. 2A and FIG. 2B, the production control computer 10 is connected to a RS485 network 21 through a network adapter 20. The RS 485 network 21 is further connected to network converters 22 and 23 that provide a flow of data to and from one or more wafer fabrication process machines 11. The RS 485 to digital converter 22 being used to connect control data to the wafer fabrication process machines 11. The analog to RS 485 converters 23 are used to connect process parameter data from the wafer fabrication machinery 11 to the process control computer 10 by means of the RS 485 network 21 and the RS 485 network adapter 20. Each RS 485 converter 22 and 23 and the 485 adapter 20 have an address, and under the control of the production control computer 10 are synchronized such that data flows to and from the appropriate adapters at the appropriate time. Process parameter data is delivered to the production control computer 10 by means of network adapter 20, network converter 23 and the RS 485 network 21 where each parameter for each process machine 11 is sampled in a time slice when the RS 485 network 21 is free of other communication. Control data is delivered to the wafer fabrication process machinery 11 from the production control computer 10 through adapter 20, RS 485 to digital converter, and the RS 485 network 21. During a trouble shooting phase the various converters 22 and 23 can be held off by the production control computer 10, and a "short interval monitor" can be applied to a problem process on one of the wafer fabrication machines 11. The "short interval monitor" consists of several data points being collected by the production control computer 10 during a short interval of time, such as one second.

Figure 3:
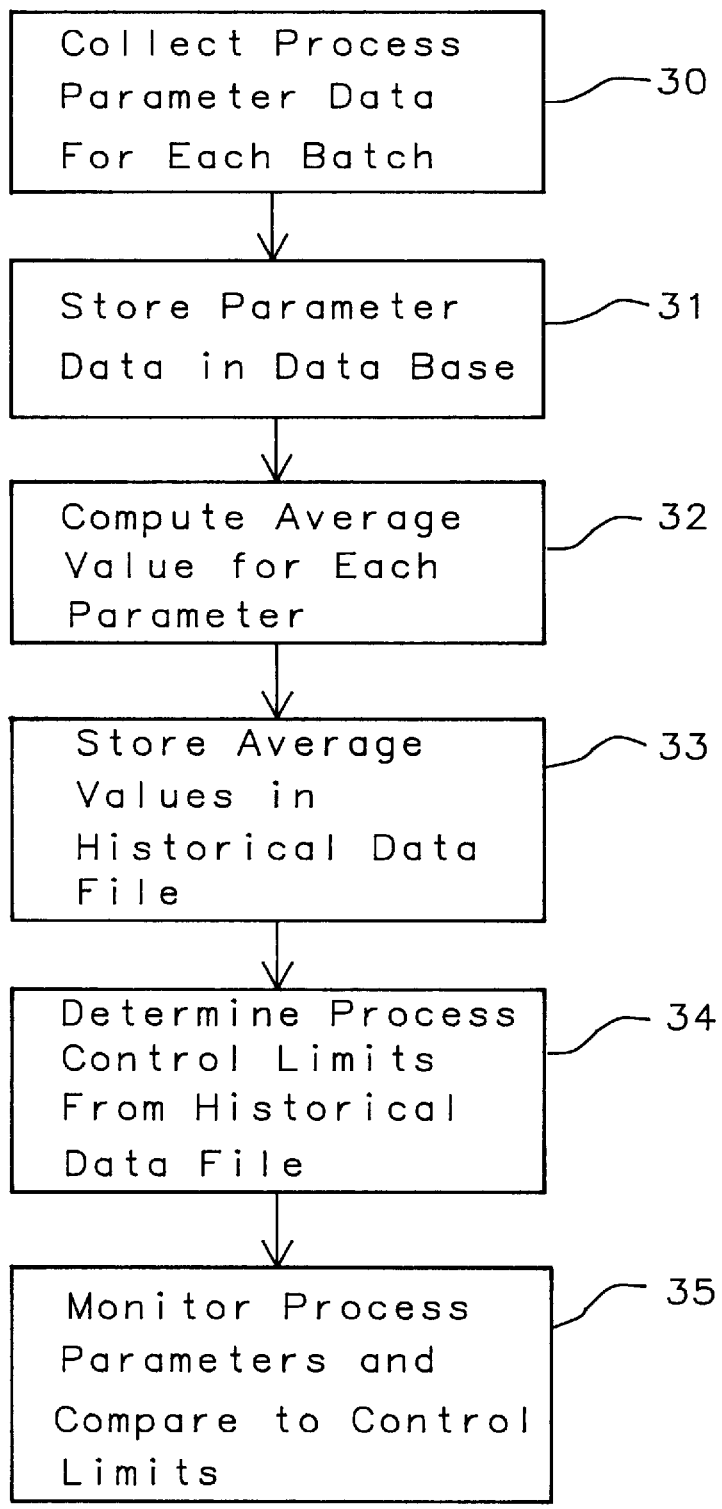
FIG. 3 is the process flow for collecting parameter data and determining control limits.

In FIG. 3 is shown the process for collecting and storing process parameter data and computing the process control limits from the process parameter data. The production control computer 10 in FIG. 1 collects process parameter data for each batch 30 of wafers being processes by each wafer fabrication machine 11. The parameter data is stored into the data base 31. An average value 32 is computed for each parameter on a batch basis. The average value is stored in a historical data file 33 contained in the database 15 within the production control computer 10. The process control limits for the various processes on the various wafer fabrication machines 11 are then computed using the data in the historical data file 34. Wafer fabrication process parameters are then compared against the control limits 35 calculated from the historical database 34. Control limits can also be established for trends in the parameter data and compared to the trend over time in the parameter data from the historical data file 34.

Figure 4:
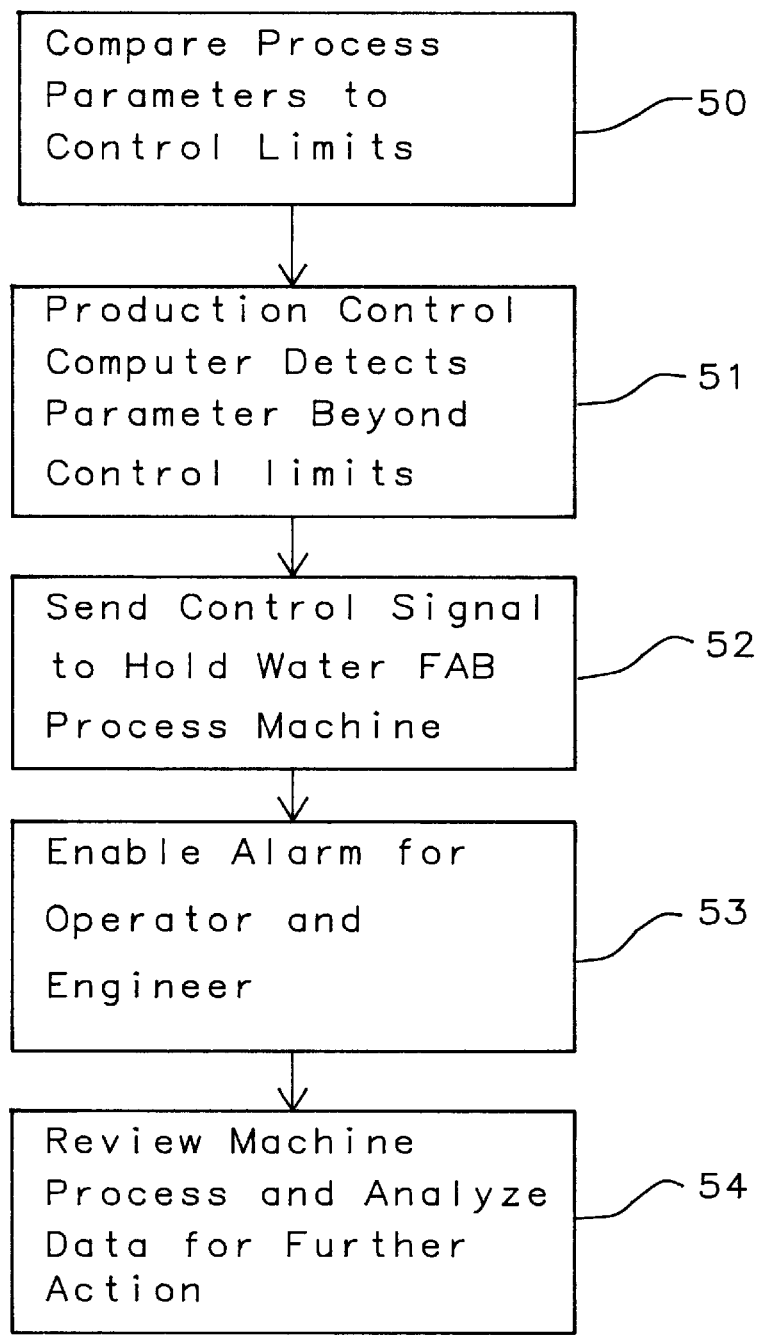
FIG. 4 is the procedure when a parameter is detected beyond a process control limit.

Referring to FIG. 4, the process parameter data being collected by the production control computer is compared against a set of control limits 50 computed from the data in the historical data file 34 in FIG. 3. When the production control computer detects a parameter beyond a control limit 51, a signal 52 is sent to hold the particular wafer fabrication process machine. Then an alarm 53 is sent to the process operator and the process engineer. This alarm is in the form of an audible tone to alert each of the process failure. Upon being alerted, the operator and the engineer review 54 the wafer fabrication machine, the product and analyze the data to determine what steps are to be taken to handle the process failure.

Figure 5:
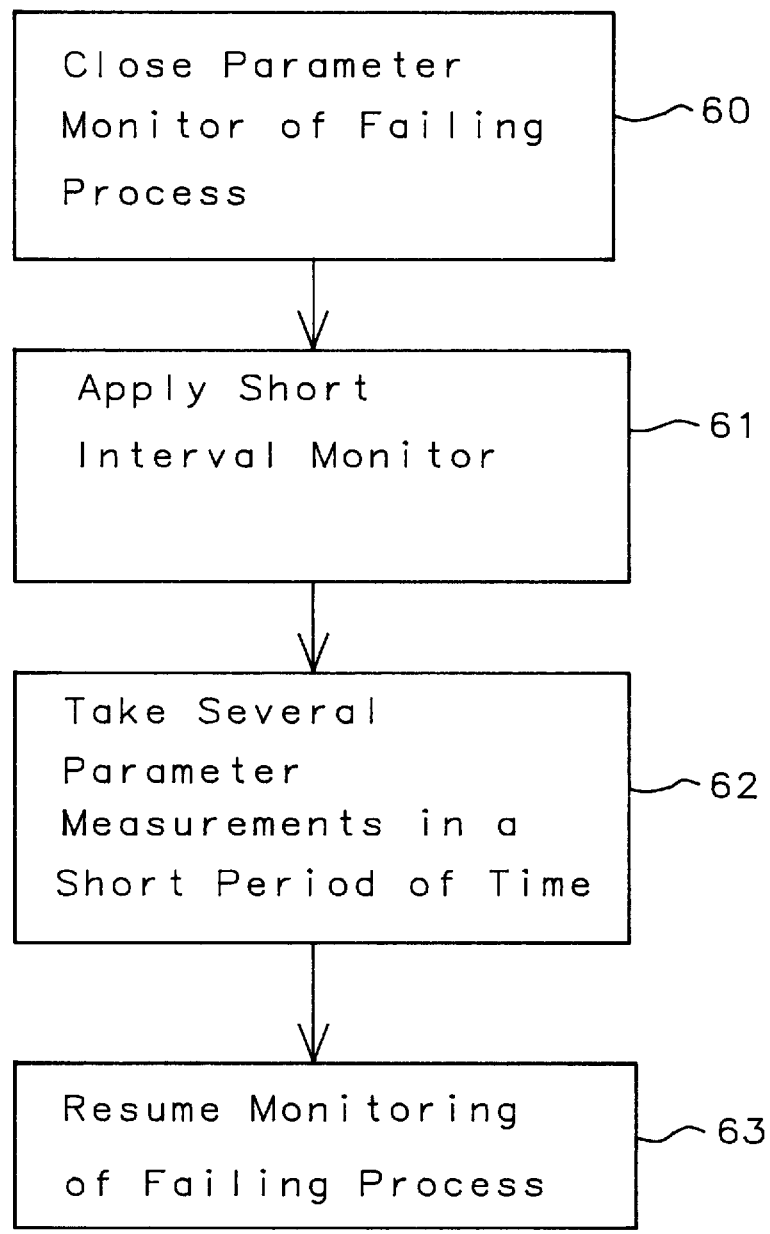
FIG. 5 is the procedure for applying a short interval monitor for diagnostics.

In FIG. 5 a procedure for a short interval monitor of a failing process is shown. The parameter monitor of the failing process is closed 60. A short interval monitor is applied to the failing process 61 where several samples of the parameters of the failing process are taken over a short interval of time 62. A short interval of time being in the neighborhood of one second, but not limited to that length of time. After the short interval monitor has been completed, the regular monitoring of the failing process is resumed.

While the invention has been particularly shown and described with reference to preferred embodiments thereof, it will be understood by those skilled in the art that various changes in form and details may be made without departing from the spirit and scope of the invention.

What is claimed is:

1. A process parameter monitoring system for real time SPC, and comprising:

a) production control computer connected to wafer fabrication machinery to monitor key parameters and provide control signals, b) said production control computer containing a database for storage and retrieval of process data collected from the wafer fabrication machinery, c) said production control computer connected to a data server, d) said production control computer having a display monitor upon which various data and parameter limits are displayed, e) said data server connecting the production control computer to a company wide network, f) said company wide network connected to a production manufacturing information system, g) said data server providing process data and information to the production control computer from the production manufacturing information system through the company wide network, h) said production control computer collecting process parameter data from the wafer fabrication machinery for each processing lot throughout the process, i) said process parameter data placed into the database contained within the production control computer.

2. The process parameter monitoring system for real time SPC of claim 1, wherein the recipe for the particular process is obtained from the production manufacturing information system and delivered to the production control computer by means of the server and the company wide network.

3. The process parameter monitoring system for real time SPC of claim 1, wherein historical process data needed to provide limits for a statistical process control is obtained from the database contained within the production control computer.

4. The process parameter monitoring system for real time SPC of claim 1, wherein data collected from a process batch by the production control computer is archived in said database for future use in determining statistical process control parameters used for each wafer fabrication process machinery.

5. The process parameter monitoring system for real time SPC of claim 1, wherein data collected from the wafer fabrication process machinery is compared to control limits developed from previous data for each wafer fabrication process machine.

6. A process control and data collection system for wafer fabrication process SPC, and comprising:

a) a production control computer connected to a RS 485 network through a RS 485 adapter, b) a RS 485 to digital converter connecting control data from the RS 485 network to each wafer fabrication process machine, c) an analog to RS 485 converter connecting process parameter data from the wafer fabrication process machinery to the production control computer by means of the RS 485 network, d) said process parameter data from the wafer fabrication process machinery providing real time process data, e) said real time process data compared to SPC limits in the production control computer to determine a probability of yield from the process, f) adjustments made to the process depending upon the real time process data as compared to the SPC limits and the probability of yield from the process.

7. The process control and data collection system of claim 6, wherein multiple wafer fabrication process machines can be monitored by the production control computer using a single RS 485 network, and comprising:

a) more than one wafer fabrication machine of the same type, b) more than one type of wafer fabrication machine, c) monitoring of one or more wafer fabrication machines can be stopped without affecting the monitoring of the other machines.

8. The process control and data collection system of claim 6, wherein real time data is collected on important process parameters for each process machine and connected to the process control computer for analysis against statistical limits for the process parameters for each process machine.

9. The process control and data collection system of claim 6, wherein the real time data collected from each process machine is placed into a historical database and used to form part of the database for future SPC limits and analysis.

10. The process control and data collection system of claim 6, wherein the real time data as collected by the production control computer provides real time status of the process, and allows corrections to the process when the real time parameters exceed statistical limits.

11. The process control and data collection system of claim 6, wherein short interval monitoring can assist process troubleshooting by sampling three process parameter data points in a short interval of time.

12. A method for real time process control by means of a process control computer connected to wafer fabrication machinery through a network, and comprising:

a) collecting process parameter data by a production control computer connected to one or more wafer process machines by means of a network, b) storing real time process parameter data into a data base, c) computing an average value for each parameter of each product batch, d) storing said average values in an historical data file, e) determining process control limits from said historical data file, f) monitoring wafer fabrication process parameters and comparing to said process control limits.

13. The method of claim 12, further comprising an alarm for parameter data that exceeds control limits, and comprising:

a) detecting parameter data from a process machine that has exceeded the process control limits, b) sending a control signal to hold said process machine with the parameter data that has exceeded the process control limits, c) enabling an alarm to both a process operator and a process engineer signaling a failing process, d) reviewing both the wafer product and the process machine to determine further action.

14. The method of claim 13, wherein a short interval monitor of the failing process can be used to help diagnose the problem, and comprising:

a) closing the parameter monitor of the failing process, b) applying a short interval monitor to the failing process and taking several parameter samples in a short time interval, c) resuming the parameter monitor of the failing process.

15. The method of claim 13, wherein a trend of a process parameter can signal a process going out of control.

\* \* \* \* \*